Fig.1a
Fig.2a
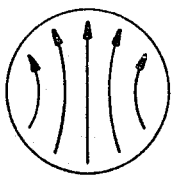
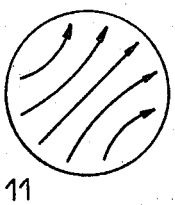
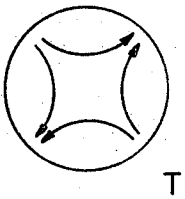
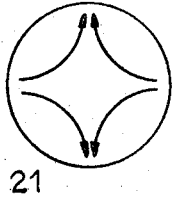
TE 11    TE 21
Fig.1b    Fig.2b
FIG. 3
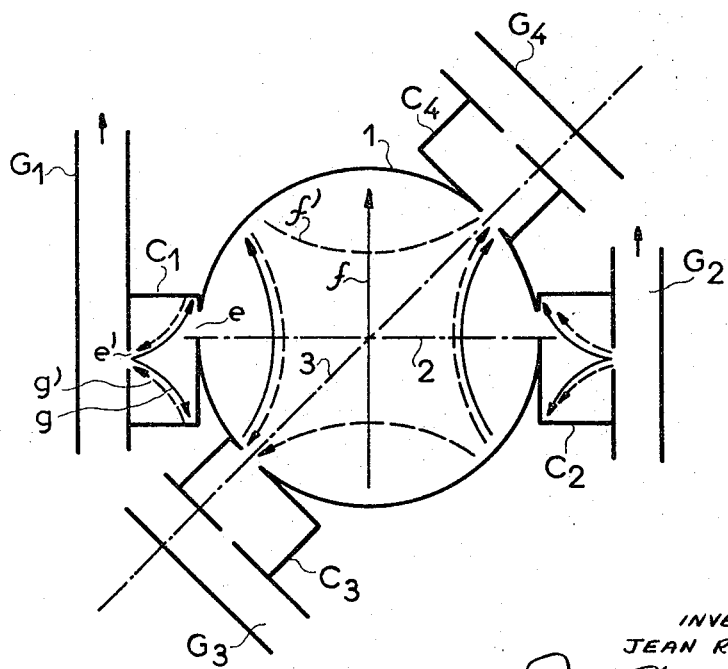

United States Patent Office 3,383,688
Patented May 14, 1968

3,383,688
SYSTEMS FOR CONTROLLING THE AUTOMATIC TRACKING IN HIGH FREQUENCY ANTENNAS
Jean Renaudie, Antony, France, assignor to Compagnie Generale d'Electricite Service de la Propriete Industrielle, Paris, France
Filed Oct. 22, 1965, Ser. No. 502,049
Claims priority, application France, Nov. 20, 1964, 995,801
6 Claims. (Cl. 343—113)

ABSTRACT OF THE DISCLOSURE

Control system for effecting automatic tracking of an object emitting a tracking signal by a high frequency receiving antenna wherein the modes $TE_{11}$ and $TE_{21}$ are extracted from a cylindrical waveguide connected to the antenna and form the "sum" and "difference," signals for determining tracking error. The modes are derived from pairs of cavities positioned on the circumference of the cylindrical waveguide at the extremities of angularly disposed diameters thereof.

---

The present invention is directed to improvements relating to automatic tracking systems for high frequency antennas and more particularly to a system serving for the excitation of a servomechanism for the alignment of a receiving antenna in a satellite tracking system, which system has an excellent efficiency together with a great structural simplicity.

In order to receive a signal within the range of high frequencies transmitted by a satellite, particularly a telecommunications satellite, it is known that the axis of maximum sensitiveness of a receiving antenna, which may be, for example, a conical horn, must be precisely pointed toward the satellite, and this condition is maintained in one known manner with movement of the satellite by means of a servomechanism excited by two input signals which are furnished by the demodulation of two signals, one signal commonly referred to as the "sum" signal and the other signal commonly referred to as the "difference" signal. It is known particularly to effect a first demodulation between a first "sum" signal and the "difference" signal which furnishes, for example, a correcting signal in azimuth, and a second demodulation between a second "sum" signal, derived from the first "sum" signal by squaring, and said "difference" signal which provides a signal of correction in elevation. Advantageously, the "sum" signal does not depend upon the accuracy of pointing of the directional axis of the antenna toward the satellite. On the other hand, the "difference" signal depends heavily upon the accurate pointing thereof and is therefore useful in conjunction with the "sum" signal to determine a tracking error signal.

The geometry of the radiation diagram between a satellite and a conical horn receiving antenna has been described in detail in the article by J. S. Cook and R. Lowell, entitled "The Auto Track System," published in The Bell System Technical Journal, vol. 42, July 1963, No. 4, Part 2, pages 1283–1307. The referenced publication discusses the tracking problems relating to the misalignment of the conical horn receiving antenna with the line of sight to the satellite and the generation of correcting signals for adjusting the position of the receiving antenna in response to the detected modes of the energy received by said antenna. In generating error signals for correcting antenna tracking position advantage is made of the information which can be derived from the energy modes of signals received from the satellite. For this purpose, the $TE_{11}$ mode in the cylindrical waveguide connected to the output of the conical horn, referred to as a "sum" signal provides a reference against which the phase and amplitude, as determined by the $TM_{01}$ mode, can be measured.

The described system includes a receiving antenna, equipped with automatic tracking in the form of a conical horn terminating in a cylindrical waveguide and is provided with an arrangement of cavities placed on the outer surface of the cylindrical guide and excited through slots in the waveguide by the waves propagated therein, the cylindrical waveguide, in turn, exciting a pair of rectangular guides. This arrangement furnishes two partial "sum" signals originating from the excitation of the cylindrical $TE_{11}$ mode in two respective orthogonal directions and an error signal originating from the excitation of the cylindrical mode $TM_{01}$.

It is known in accordance with this prior art system that the $TM_{01}$ mode, referred to hereinafter as the "difference" signal has an amplitude which is proportional to the pointing error $\theta$ of the antenna and a phase proportional to $\phi$, the direction of the pointing error. On the other hand, the $TE_{11}$ mode or "sum" signal can be utilized as a reference because the magnitude thereof is invariant with the pointing error $\theta$, when $\theta$ is small, and the mode is excited such that the polarization of the incoming signal is also preserved regardless of the pointing error, when $\theta$ is small. Thus, the measurement of any two orthogonal components of the mode $TE_{11}$ will determine the polarization of the transmitted signal. The mode can therefore be utilized effectively as a phase and an amplitude reference.

In the known system, the horizontal and vertical components of the $TE_{11}$ mode are sampled separately and constitute the two "sum" signals which with the "difference" signal derived from the $TM_{01}$ mode serves to define the tracking error of the antenna. However, this system operates effectively only if the polarization of the transmitted signal is circular, or at worst only slightly elliptical, since for circular polarization the $TM_{01}$ mode will have a null point on the antenna axis, which characteristics forms the basis for the servocontrol of the antenna in accordance with the known system.

On the other hand, if the polarization of the transmitted signal is linear, instead of circular or elliptical, the $TM_{01}$ mode, characterized by a radial electric field vector, will be insensitive to errors orthogonal to the plane of polarization. If on a portion of the trajectory thereof, the satellite emitting a linearly polarized signal preserves a direction of constant radial displacement with an orientation of its emitting antenna such that the wave emitted is in quadrature with the direction of displacement of the satellite, and thus also in quadrature with the electric field of said mode, an error signal will not be received despite the pointing error of the antenna.

When the polarization of the transmitted signal is linear, an error orthogonal to the plane of polarization will not excite radially symmetric electric fields in the antenna, and thus the beneficial characteristics of the $TM_{01}$ mode are lost with such an arrangement. The basic cause of this problem is that for a circularly polarized signal the $TM_{01}$ mode experiences a null point on the antenna axis; whereas, for a linearly polarized signal, the mode experiences a null plane orthogonal to the axis of polarization.

The problems relating to the attempt to control tracking of a satellite transmitting linearly polarized signals using the $TM_{01}$ mode are well recognized. Indeed, it is well known that under these circumstances the target will eventually slip away in the null plane of the system. Yet, one of the only suggested solutions to date is to introduce a small cross polarization component into the transmitted signal to restore the null point; however, this compromise reduces the response time and otherwise eliminates or reduces the advantages attendant to the use of linear polarized transmission.

In order to obviate this difficulty, the present invention has the object of furnishing a non-zero error signal for a received wave having any direction of polarization. For obvious reasons, the realization of this object necessitates the use of a mode wherein the electric field vector does not have a symmetry of revolution, this mode being utilized to provide a pair of "difference" signals along two different directions in the guide.

It is an object of the present invention to provide an automatic tracking control system for high frequency antennas which avoids all of the difficulties and disadvantages inherent in prior art devices.

It is another object of the present invention to provide an automatic tracking control system for high frequency antennas which furnishes a positive error tracking signal regardless of the polarization or orientation of the received tracking signal.

It is a further object of the present invention to provide an automatic tracking control system for high frequency antennas which provides accurate tracking under all conditions without material increase in equipment over previous devices of less dependability.

In accordance with the present invention, there is provided a system of servocontrol for a tracking antenna operating from a pair of signals called a "sum" signal and a "difference" signal, wherein the "sum" signal is obtained from a mode $TE_{11}$ propagated in a cylindrical guide and extracted from two different diameters within the guide forming therebetween an angle $a$, by means of two pairs of cavities placed on the circumference of said cylindrical guide at the extremities of the two diameters, and the "difference" signal is obtained from a mode $TE_{21}$ propagated in said cylindrical guide and extracted along two different diameters of the guide forming therebetween an angle $b$ by means of two pairs of cavities placed on the circumference of the guide at the extremities of the two diameters of the angle $b$.

These and other objects, features and advantages of the invention will become more clearly understood when considered in light of the following specific description of the invention taken with the accompanying drawings, which illustrate one exemplary embodiment of the instant invention, wherein:

FIGURES 1a and 1b show a field pattern of the cylindrical mode $TE_{11}$ producing the pair of "sum" signals;

FIGURES 2a and 2b show the field pattern of the cylindrical mode $TE_{21}$ producing the pair of "difference" signals;

FIGURE 3 shows in schematic form a preferred embodiment of the present invention;

Looking more particularly to the drawings, FIGURE 1 shows at $(a)$ and $(b)$ two diagrams of the field pattern of the dominant mode $TE_{11}$ excited in a cylindrical guide connected to a receiving horn taken along two diametric directions of the guide separated by an angle of 45°. FIGURE 2 shows at $(a)$ and $(b)$ two diagrams of the field pattern of the mode $TE_{21}$ excited in the aforementioned guide taken along the same two directions.

FIGURE 3 illustrates schematically a cylindrical guide 1 in which a mode $TE_{11}$ represented by the arrows in continuous lines, such as $f$, is excited by the received signal according to FIGURE 1a and a mode $TE_{21}$ represented by the arrows in broken lines, such as $f'$, is excited according to FIGURE 2a.

These two modes according to this orientation are collected by a single pair of cavities $C_1$ and $C_2$ placed on the circumference of the aforementioned cylindrical guide 1 on respective ends of a first diameter 2 and each are provided with an excitation orifice, such as $e$. The cavities $C_1$ and $C_2$ are excited in phase by the mode $TE_{11}$ and the same cavities are excited in phase opposition by the mode $TE_{21}$ as is indicated by the arrows in continuous lines, such as $g$, and the arrows in broken lines, such as $g'$. The cavities $C_1$ and $C_2$ in turn excite respectively two rectangular guides $G_1$ and $G_2$ by means of orifices, such as $e'$.

There exists a second device on the guide identical to the preceding one comprising two cavities $C_3$ and $C_4$ on a respective end of a diameter 3 at 45° to the aforementioned diameter 2, exciting two rectangular guides $G_3$ and $G_4$ from the energy modes $TE_{11}$ and $TE_{21}$ in a second orientation in conformity with FIGURES 1b and 2b. In order not to overly complicate FIGURE 3, the modes excited according to this second orientation have not been indicated by arrows. In addition, the cavities $C_3$ and $C_4$ excite two rectangular guides $G_3$ and $G_4$, by means of orifices, such as $e'$.

Figure 4:
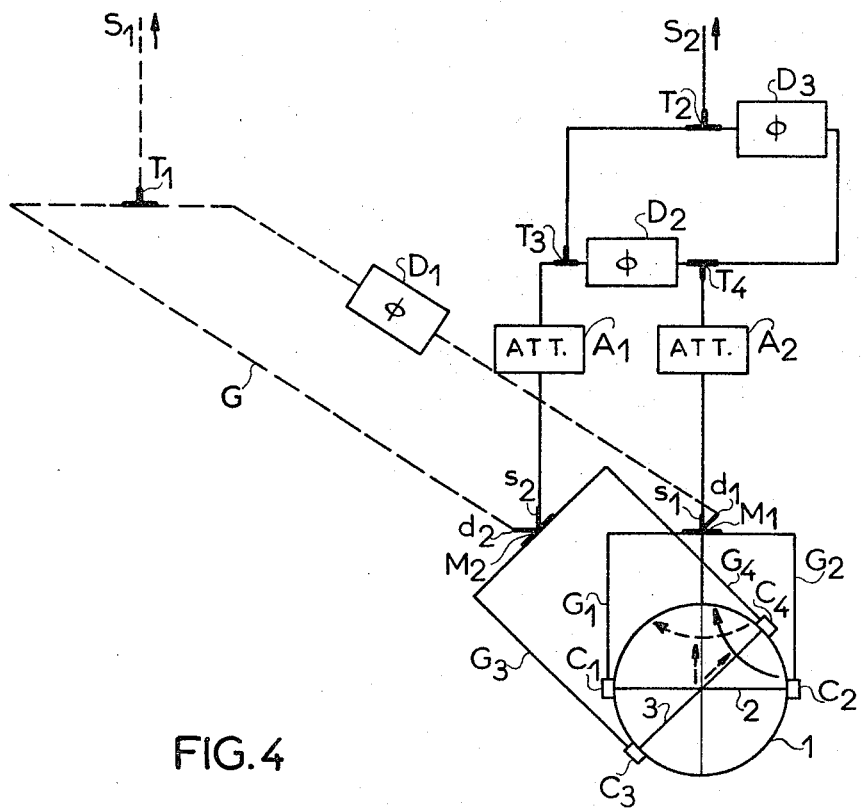
FIGURE 4 is a schematic diagram of a system, within the framework of the present invention, for obtaining the necessary corrective signals for antenna control utilizing the instant invention.

The arrangement of FIGURE 3 which extracts energy of the modes $TE_{11}$ and $TE_{21}$ from the cylindrical guide connected to the receiving horn antenna along two diametric directions of the guide is utilized in a system for providing corrective signals for antenna control, such as provided in FIGURE 4. In FIGURE 4 reference numerals 1–3, $C_1$–$C_4$, $G_1$–$G_4$ refer to the elements designated by corresponding symbols in FIGURE 3.

All of the transmission paths designated $G_1$ through $G_4$ and G are rectangular waveguides of the type conventionally used for wave transmission at high frequencies. The elements $T_1$ through $T_4$ are combined T's of the type well known in the microwave art. The elements $M_1$ and $M_2$ are "magic T's," equally well known, which provide difference outputs $d_1$ and $d_2$, respectively, and sum outputs $s_1$ and $s_2$, respectively. In the path between the sum output $s_2$ of "magic T" $M_2$ and the T $T_3$ there is provided an attenuator $A_1$, providing an attenuation of $1/2$. In the path between the sum output $s_1$ of the "magic T" $M_1$ and the T $T_4$ there is provided an attenuator $A_2$ providing an attenuation of $\sqrt{2}/2$.

A phase shifter $D_1$ providing a phase shift of $\epsilon\pi/2$ is connected in the line between the difference output $d_1$ of "magic T" $M_1$ and the T $T_1$. A phase shifter $D_2$ providing a phase shift of $\pi$ is provided between T's $T_3$ and $T_4$, and a phase shifter $D_3$ providing a phase shift of $-\epsilon\pi/2$ is provided between the T's $T_2$ and $T_4$. The quantity $\epsilon$ may be either $+1$ or $-1$.

The calculation shows that one obtains at $S_1$, the output of T $T_1$, under these conditions, a "difference" signal depending upon the accuracy of pointing of the antenna and at $S_2$, output of the T $T_2$, a "sum" signal independent of the accuracy of pointing of the antenna.

Given the process of generation of the "difference" signal, there exists a "difference" signal for any orientation of the satellite with respect to the antenna and for any direction of the trajectory thereof.

Such an attenuator may be constituted by a plate of graphited cardboard in the form of a semicircle which one drives in parallel to the small side of the guide.

Such phase shifters may be constituted by a Teflon plate of thickness dimensioned to obtain the desired phase shift.

The role of the attenuators is to obtain equality of power in the two outputs $S_1$ and $S_2$.

The role of the phase shifters is to furnish a separation of the modes in the output of the T's.

Figure 5A:
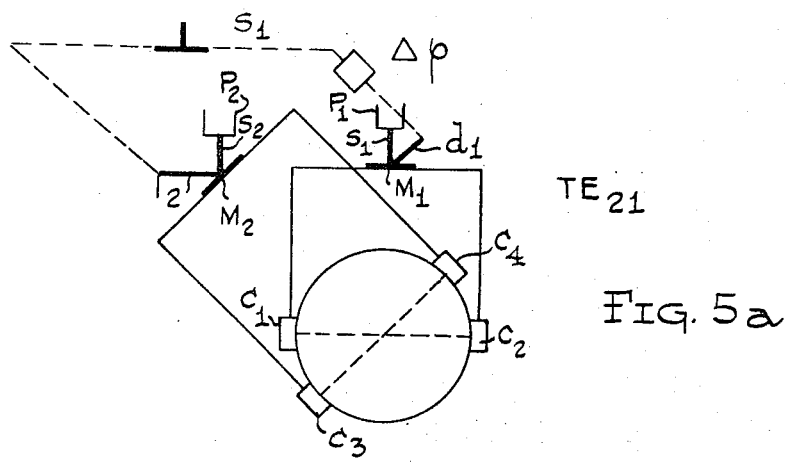
FIGURES 5a and 5b illustrate a second embodiment of the present invention.
Figure 5B:
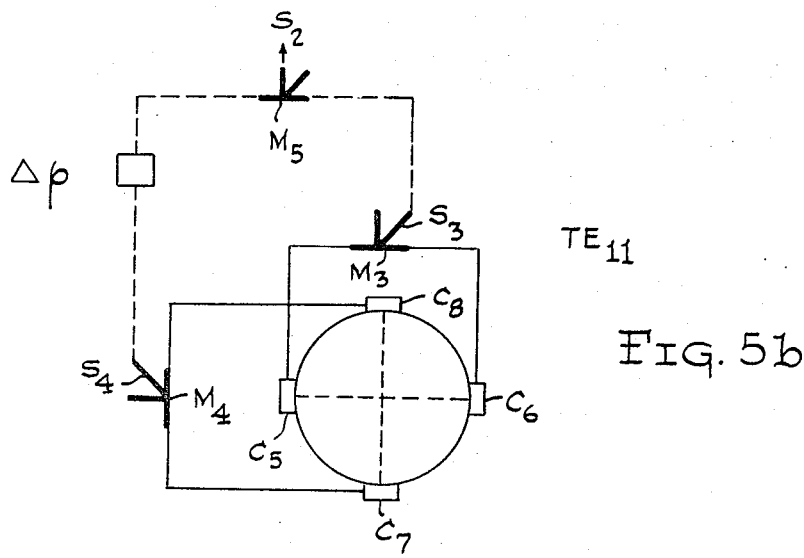

As indicated above, the modes $TE_{11}$ and $TE_{21}$ may also be extracted separately by providing two pairs of cavities on the circumference of the cylindrical guide at the extremities of two diameters within the guide forming an angle $a$ therebetween for extracting one mode and two other pairs of cavities on the circumference of the cylindrical guide at the extremities of two diameters within the guide forming an angle $b$ therebetween. Such an arrangement is illustrated in FIGURES 5a and 5b. The arrangement of FIGURE 5a for extracting the $TE_{21}$ mode corresponds to the arrangement of FIGURE 4 as far as the $S_1$ circuit is concerned, the elements $P_1$ and $P_2$ being short circuits of the "sum" outputs of the T's $M_1$ and $M_2$. The $TE_{11}$ mode is extracted by the arrangement illustrated in FIGURE 5b by means of cavities $C_5$, $C_6$, $C_7$ and $C_8$.

While I have shown and described several embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:
1. Control system for effecting the automatic tracking by a high frequency receiving antenna of an object omitting a tracking signal comprising:
   a high frequency antenna,
   a cylindrical waveguide connected to the output of said antenna,
   a first pair of cavities positioned on the circumference of said waveguide on either end of a first diameter thereof, said cavities being coupled to said waveguide, a second pair of cavities positioned on the circumference of said waveguide on either end of a second diameter disposed at an angle to said first diameter, said second pair of cavities being coupled to said waveguide,
   said first and second pair of cavities being proportioned and positioned to be excited by a first mode $TE_{11}$ and a second mode $TE_{21}$, said first and second pairs of cavities being coupled respectively to four rectangular waveguides in which are excited the cylindrical modes $TE_{11}$ and $TE_{21}$,
   a first "magic T" having two inputs, connected to respective ones of said first pair of cavities, and having a sum output and a difference output, and a second "magic T" having two inputs, connected to respective ones of said second pair of cavities, and having a sum output and a difference output, the difference outputs of said first and second "magic T's" being combined to produce a difference signal, a first phase shifter connected to one of said difference outputs, the sum outputs of said first and second "magic T's" being combined to produce a sum signal.

2. A control system for effecting the automatic tracking by a high frequency receiving antenna of an object emitting a tracking signal comprising:
   a high frequency antenna,
   a cylindrical waveguide connected to the output of said antenna,
   two first pairs of cavities positioned on the circumference of said waveguide on the ends of a first pair of diameters thereof forming an angle $a$ therebetween, said first pairs of cavities being proportioned and positioned to be excited by a mode $TE_{11}$, and
   two second pairs of cavities positioned on the circumference of said waveguide on the ends of a second pair of diameters thereof forming an angle $b$ therebetween, said second pairs of cavities being proportioned and positioned to be excited by a mode $TE_{21}$.

3. A control system for effecting the automatic tracking by a high frequency receiving antenna of an object emitting a tracking signal comprising:
   a high frequency antenna,
   a cylindrical waveguide connected to the output of said antenna,
   means for extracting from said waveguide at least a first pair of energy signals derived from a first mode $TE_{11}$ and a second pair of energy signals derived from a second mode $TE_{21}$, and
   means for combining said first and second pairs of energy signals to produce "sum" and "difference" signals for correcting the pointing of said antenna.

4. A control system as defined in claim 3 wherein said means for extracting energy from said waveguide includes a plurality of cavities positioned on the circumference of said waveguide and being coupled to said waveguide to extract energy from said first mode $TE_{11}$ and said second mode $TE_{21}$.

5. A control system as defined in claim 4 wherein said cavities are positioned on both ends of a pair of diameters of said waveguide, said diameters being disposed at an angle to one another of 45°.

6. A control system as defined in claim 5 wherein said cavities are coupled respectively to rectangular waveguides in which are excited the cylindrical modes $TE_{11}$ and $TE_{21}$.

References Cited
UNITED STATES PATENTS 3,259,899  7/1966  Cook _____ 343—113

OTHER REFERENCES

Proceedings of the I.R.E., December 1953, pp. 1726–7.

RODNEY D. BENNETT, *Primary Examiner.*

R. E. BERGER, *Assistant Examiner.*